Oct. 9, 1973  G. P. BOYLE  3,764,395
IMMERSION THERMOCOUPLE
Original Filed April 26, 1968  2 Sheets-Sheet 1

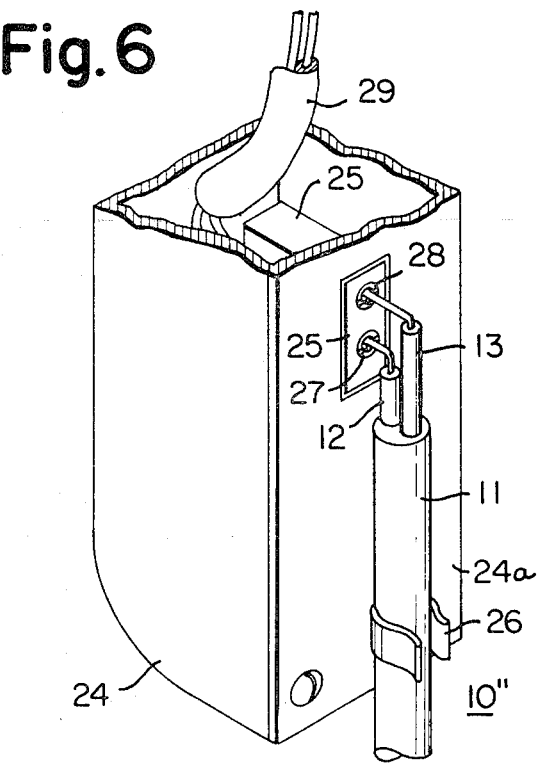
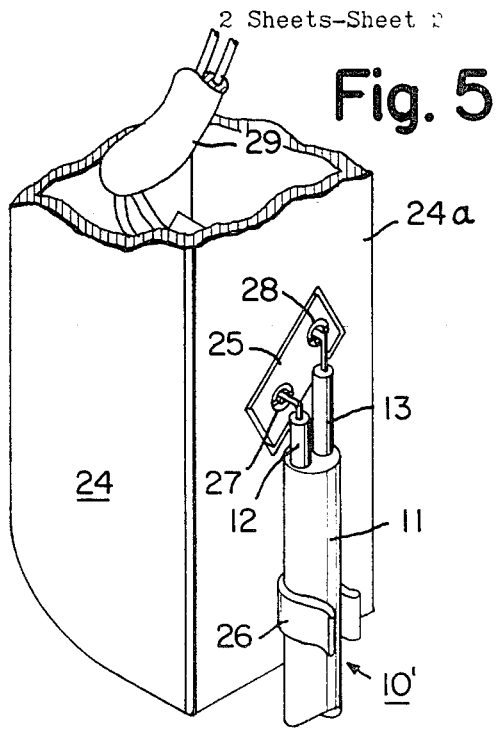
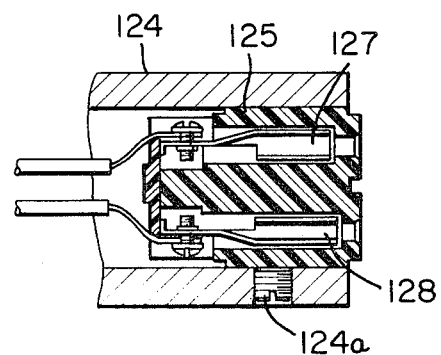
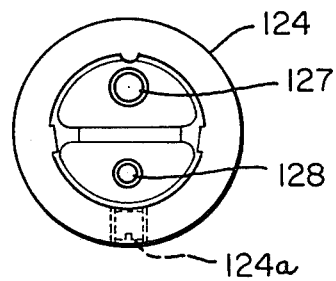
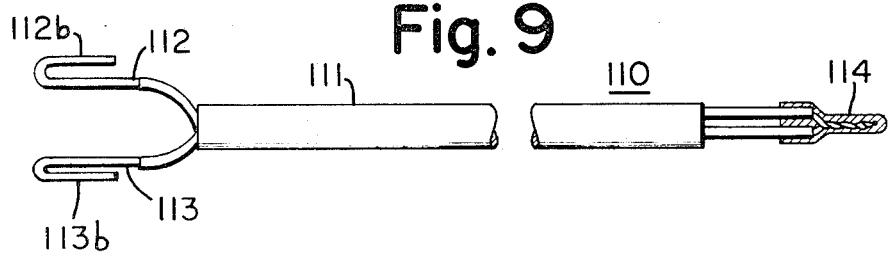

United States Patent Office 3,764,395
Patented Oct. 9, 1973

3,764,395
IMMERSION THERMOCOUPLE
Gerald P. Boyle, Philadelphia, Pa., assignor to Leeds & Northrup Company, Philadelphia, Pa.
Continuation of abandoned application Ser. No. 724,463, Apr. 26, 1968. This application Feb. 22, 1971, Ser. No. 117,771
Int. Cl. H01v 1/04
U.S. Cl. 136—234                                    1 Claim

ABSTRACT OF THE DISCLOSURE

A low-cost, throw-away, plug-in thermocouple probe having an end for immersion in a bath of molten material and bare wires at the other end shaped in a manner to form a polarized connector for reception in a female connector which may additionally have other probe orienting structure to insure connection of the parts of corresponding polarity.

CROSS-REFERENCE

This is a continuation of the parent application Ser. No. 724,463, filed Apr. 26, 1968, now abandoned.

BACKGROUND OF THE INVENTION

For many years there have been available on the market various types of hand-held thermocouple devices for use in measuring the temperature of molten materials in ladles or the like. In some of these devices the thermocouple is comprised of bare wires, in others the thermocouple is housed in a metal well structure, and others are constructed so that the immersion portion of the thermocouple is protected by a replaceable closed end quartz tube. In more recent years immersion thermocouples for use in foundries and melt shops have ben constructed in various forms utilizing the teachings of U.S. Pats. 2,999,121—H. G. Mead; 3,024,295—P. J. Moore; 3,048,642—K. B. Parker, Jr.; 3,055,961—D. Robertson et al; and others. As new designs have envolved, efforts have been directed to reduction in the limit of error of the temperature measurement while at the same time keeping the cost per reading at a minimum.

SUMMARY OF THE INVENTION

In accordance with the present invention, applicant provides an expendable immersion thermocouple of the plug-in type which is more simple in construction and lower in cost than the quartz sheath protected expendable immersion thermocouples in use heretofore. The thermocouple is of a type having all of the advantages of prior art thermocouples which included means electrically to insulate the heat sensing junction of the thermocouple from the material of the molten bath. Applicant has discovered that commercially available asbestos insulated two-conductor thermocouple cable which manufacturers recommend for use at temperatures below about 1400° F. to 1500° F. will withstand several immersions in baths of molten material for periods as long as 30 seconds at temperatures up to about 2500° F. to 2600° F. without an unreasonable amount of sputtering or agitation of the material of the molten bath.

In a preferred embodiment of applicant's invention, a 12" to 14" length of commercially available silicone impregnated, asbestos insulated, two-conductor cable having 16 B&S gauge solid conductor Chromel and Alumel wires can readily be fabricated into a very satisfactory expendable immersion thermocouple probe of suitable rigidity by stripping insulation from each end of the piece of cable, joining the bare wires at one end by a twisting operation to form a thermoelectric junction and cutting the bare wires at the other end so that the bare portions are of different length and/or bending the bare portions preferably laterally in the same direction relative to the longitudinal axis of the piece of cable at an angle of approximately 90° to form pin-type male contacts of a polarized electrical connection when the cable length and said cut and/or bent portions are plugged into a female thermocouple contact and support structure having a cable engaging and orienting portion.

It is a specific object of my invention to provide a plug-in thermocouple probe comprised of two electrical conductors of different thermoelectric materials having a rigidity at least as great as #16 B&S gauge and eletrically insulated one from the other. The bare end portions of the conductors at one end are joined to form a thermoelectric junction and the bare end portions of the conductors at the opposite end form free-standing male connector pins for electrically connecting the thermocouple probe to a measuring circuit. The free-standing male connector pins have end portions with bends of approximately 90° with respect to the longitudinal axis of the thermocouple probe in a direction and spaced apart to an extent to form a polarized plug-in electrical connector.

BRIEF DESCRIPTION OF THE DRAWINGS

For a more detailed understanding of the invention, reference is made in the following description of preferred embodiments thereof to the accompanying drawings in which:

FIG. 5 is a partial perspective view showing a modification of the invention;

FIG. 6 is a partial perspective view showing another modification of the invention;

FIG. 7 is a side view in section of another form of contact structure with an assembly similar to that of FIG. 3;

FIG. 8 is an end view of the contact structure of FIG. 7; and

FIG. 9 is a plan view of the thermocouple probe for use with the contact structure of FIGS. 7 and 8.

DESCRIPTION OF THE PREFERRED EMBODIMENT

Figure 1:
FIG. 1 is a perspective view of a thermocouple probe in accordance with applicant's invention.

Referring to FIG. 1, there is indicated a thermocouple probe 10 comprised of a length 11 of asbestos insulated No. 16 B&S gauge, Chromel-Alumel thermocouple cable. The piece 11 about 12" to 14" long is cut from a long length of the purchased cable. Insulated thermocouple cable of this type is available from many suppliers of thermocouple materials in coils having lengths of, for example, 500 feet. Such cable is purchased according to specification and it has been found that cable obtainable from the Leeds & Northrup Company as No. 16–58–2 thermocouple cable is quite satisfactory. Such cable is comprised of one No. 16 B&S gauge solid conductor 12 of Chromel and one No. 16 gauge solid conductor 13 of Alumel. The Chromel conductor is first uniformly coated with a layer of electrical insulation such as enamel, then Chromel and Alumel conductors are each covered with felted asbestos having a nominal thickness of about 0.020" impregnated with a silicone resin compound. The Chromel wire is colored yellow and the Alumel wire colored red for reasons understood by those skilled in the art. The two insulated conductors are laid parallel and covered with an asbestos braid impregnated with silicone resin compound.

The outer covering of silicone impregnated asbestos is stripped from one end of the piece of cable for a distance of about 1¼" and from the other end a distance of about 1¾". Thereafter, at the end from which the lesser amount of the outside braid has been removed, the individual silicone impregnated asbestos covered wires 12 and 13 are stripped of insulation and the ends joined to form a thermoelectric junction 14. The latter is generally achieved by holding the bared end portions of the wires tightly together and twisting three or four times. After the junction is formed, it is dipped into a fluid, air drying refractory cement to a depth sufficient to coat the junction and the adjacent asbestos insulated wire portions. Suitable cements are well known to those skilled in the expendable thermocouple art. At the opposite end of the cable length the Chromel and Alumel wires are bared for a distance of about 1½" being sure to remove all of the enamel from the Chromel wire 12. After these portions have been stripped bare of insulation to form free-standing male connector pins the length of cable 11 is turned so that as viewed in FIG. 1 the Chromel wire 12 is to the right and the Alumel wire 13 is to the left and both wires separated about 7/16" and bent downwardly, i.e. laterally in the same direction relative to the longitudinal axis of the piece of cable, as shown at 12a and 13a to form male contacts i.e. free-standing male connector pins of a polarized plug-in electrical connector. The terminal portions of each wire may then be reversely bent as shown at 12b and 13b for a distance of about ½" effectively to increase the cross-section of the contacts. Bending the wires laterally in the same direction produces a polarized contact structure in a manner later to be described. The finished probe 10 will be found suitably rigid to permit thrusting the probe into a bath of molten material.

Figure 2:
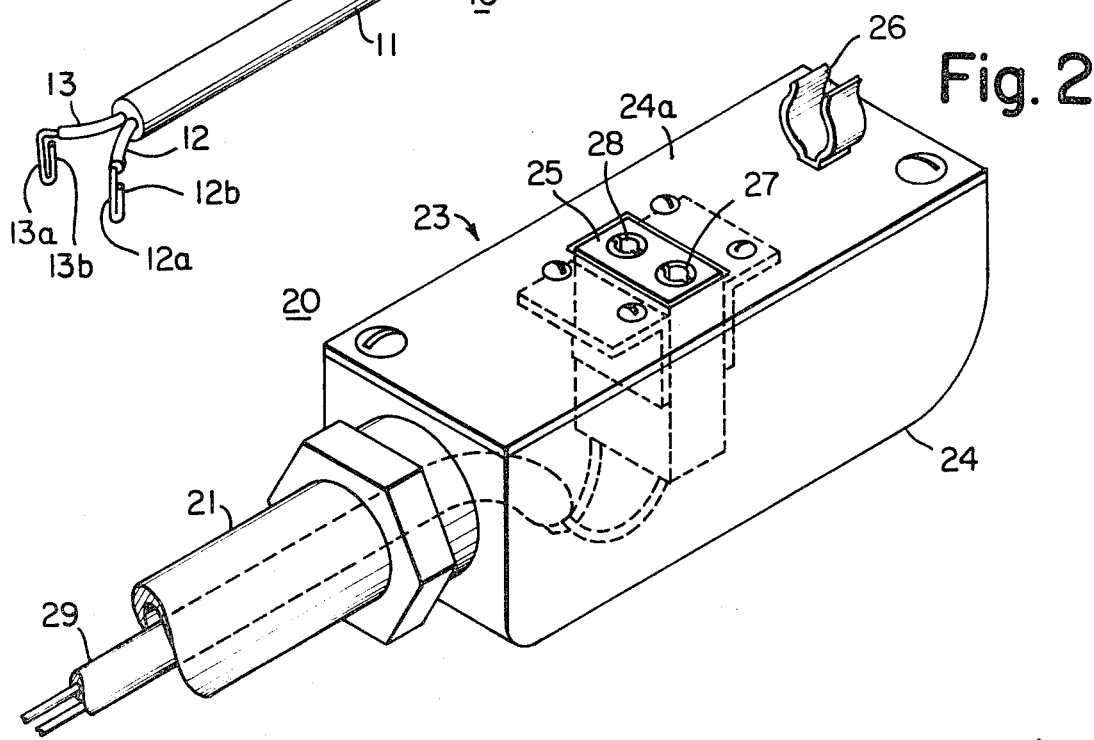
FIG. 2 is a perspective view showing a connector structure suitable for use with thermocouple in accordance with applicant's invention.

In FIG. 2 there is disclosed a portion of a manipulator structure 20 comprised of a length of pipe 21 having any suitable handle structure 22 (shown only in FIG. 3) at a remote end and thermocouple connection and support structure 23. A handle of the type disclosed in any of the aforesaid patents to Moore, Parker, or Robertson et al. is suitable. The connection and support structure 23 for the thermocouple is readily made from an electrical outlet box 24 which is of a type well known to those skilled in the art. The top 24a of the box is modified in a manner to support a two-holed thermocouple connector 25 of a type commercially available which is also well known to those skilled in the art. A clip 26 of the clamp type is mounted on the cover 24a toward the end of the box 24 beyond which the thermocouple probe 10 will extend. The disposition of female, collet-type, spring-loaded connectors, 27 of Chromel and 28 of Alumel, of connector 25 and the clip 26 which is adapted to engage and orient the length 11 of thermocouple cable together with the direction of the bends in the bent portions 12a and 13a in the thermocouple wires 12 and 13 automatically provide a polarized type of connection. That is to say, the thermocouple can only be installed in a manner such that the connections will be of the proper polarity.

Figure 3:
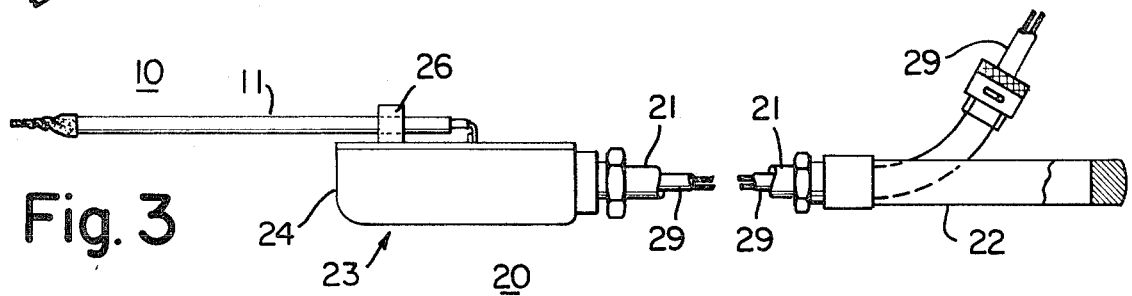
FIG. 3 is a side elevation view showing applicant's invention assembled and ready for use.

Referring to FIG. 3 it may be observed that in operation the thermocouple probe 10, which is fairly stiff in view of the size of the solid conductors making up the short length 11 of thermocouple cable, will be plugged into the connector and support structure 23 with the clip 26 brought into engagement with the length 11 of thermocouple cable which forms the body portion of the probe 10. An extension leadwire cable 29 is connected at one end to the female contacts 27 and 28 of the connector 25 and etxends through the manipulator 20 to and beyond the handle end 22 by means of which the probe 10 is connected to a measuring instrument (not shown). The equipment is thus made ready for use.

Figure 4:
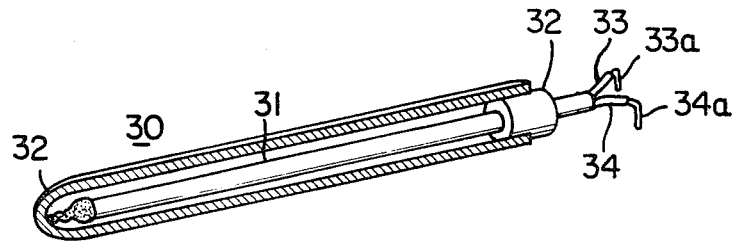
FIG. 4 is a view showing a thermocoupled in a well.

FIG. 4 is illustrative of a thermocouple probe 30 including a thermocouple 31 of any known type encased in a well 32 of any suitable material and retained therein by a packing gland illustrated by a plug 32 of sealing material. The wires 33 and 34 extending out of the probe are of material of suitable rigidity to form male plug-in contact members, that is to say, free-standing male connector pins of a plug-in electrical connector. They are bent as above described to position the male contact pins in alignment with corresponding female contacts of a plug-in connector in order to provide polarized contact structure 33a, 34a for cooperation with a female connector and support structure of the type shown in FIGS. 2 and 3.

From the foregoing description of FIGS. 1–3, it will be seen that the female contacts 27 and 28 which are respectively Chromel and Alumel in connector 25 respectively receive the male connector pins 12a, 12b, and 13a, 13b, FIG. 1, which are respectively Chromel and Alumel, of the thermocouple probe 10. In FIG. 5 there is illustrated a modification of the invention wherein the connector 25 is positioned at an angle, for example 45°, with respect to the position illustrated in FIG. 2. With this arrangement the female contact 27 is positioned below the adjacent female contact 28. The bare end portions of the thermocouple wires 12 and 13 are cut at different lengths and, if desired, bent to form an angle of approximately 90° with respect to the longitudinal axis of the probe 10' thus to form free-standing male connector pins to be received in the corresponding female contacts 27 and 28 respectively as shown in FIG. 5. The probe 10' is polarized by reason of cutting the wires 12 and 13 to different lengths and it will not be possible to insert the probe in the connector 25 in any other manner than the one illustrated in FIG. 5, even though the wires are not pre-bent. In operation, the free-standing male connector pins may be inserted into the female connector 25 and the probe 10' bent downwardly into the clip 26. Since the resultant lateral displacement of the contacts 27 and 28 from the longitudinal axis has been effectively decreased for the modification shown in FIG. 5, the thermocouple wires 12 and 13 need not be bent apart as illustrated in FIG. 1. It is to be understood that the reverse bends 12b and 13b, FIG. 1, may be eliminated by providing female contacts 27 and 28 of appropriate size. The probe 10' in other respects is identical to the probe 10 illustrated in FIG. 1.

Referring to FIG. 6, there is illustrated another modification wherein connector 25 has been positioned in a box 24 at 90° with respect to the position illustrated in FIG. 2. With this arrangement the thermocouple wires 12 and 13 of probe 10" are cut to different lengths similar to probe 10' of FIG. 5. However, in this case it is preferable that they be pre-bent. In other respects the probe 10" is similar to probes 10 and 10'.

In the modification of FIGS. 7–9, those parts which correspond to those of FIGS. 1–3 are given the same reference numerals increased by 100. A thermocouple connector 125 of the same variety as that shown in FIG. 2 has a pair of collet-type spring-loaded connectors 127 and 128 of Chromel and Alumel respectively. The Chromel collet 127 has a larger internal diameter than the Alumel collet. The collets are supported in a rounded molded body which is retained in the end of a pipe-shaped housing 124 by a set screw 124a. The housing 124 is screwed onto the threaded end of a pipe not shown which would be like the pipe 21 of FIGS. 2 and 3.

Referring to FIG. 9, it will be seen that the end 112b forms a U-shaped portion with a larger gap between the straight portions of wire 112 forming the U than does the reversely bent portion 113b. Thus the thermocouple probe 110 can be accepted only one way by the connector 125, hence the arrangement is polarized.

Instead of having the collets 127 and 128 side by side, it will be appreciated that they may be displaced longitudinally and the ends of wires 112 and 113 cut off at different lengths so that they can effect contact with the longitudinally displaced collets in a polarized manner.

From the foregoing it is believed clear that applicant's thermocouples are substantially fool-proof structures of very simple design which are inexpensive to manufacture. While Chromel and Alumel conductors insulated with felted asbestos impregnated with silicone resin have been found very satisfactory for applications involving temperatures below the melting temperature of the Alumel of the thermocouple materials, it is clearly to be understood that other materials and modifications in the form of the thermocouple will be found suitable depending upon the intended use of the device.

What is claimed is:

1. An immersion thermocouple assembly having a manipulator structure with a handle portion at one end and at the other end plug-in electrical connector structure having an outer flat surface portion disposed parallel to the longitudinal axis of said manipulator structure and including a pair of spring loaded female contacts disposed in said outer flat surface parallel to the longitudinal axis of said manipulator structure and in engagement with a pair of male contacts of a plug-in thermocouple probe, said plug-in electrical connector structure also including a probe engaging clip on said outer flat surface, and said plug-in thermocouple probe having male contacts which consist of first bare ends of a pair of electrically insulated thermocouple wires having second ends mechanically and electrically joined to form said thermocouple probe, said first bare ends of said thermocouple wires including bent portions increasing the effective cross-sectional area of said male contacts and which in cooperation with said clip effect electrical connection of said thermocouple probe with the proper polarity upon engagement of said male contacts with said female contacts and said probe with said clip.

References Cited

UNITED STATES PATENTS

| 3,038,957 | 6/1962 | Mead | 136—234 |
| 3,481,201 | 12/1969 | Falk | 136—234 |
| 3,386,861 | 6/1968 | Stroik | 136—234 |
| 3,201,277 | 8/1965 | Fish | 136—234 |
| 3,427,208 | 2/1969 | Lowdermilk | 136—234 |
| 3,267,732 | 8/1966 | Hance | 136—234 |
| 3,048,642 | 8/1962 | Parker, Jr. | 136—234 |
| 3,294,592 | 12/1966 | Fish et al. | 136—234 |
| 3,011,004 | 11/1961 | Meador | 136—231 |
| 3,487,353 | 12/1969 | Massa | 339—184 R |
| 3,102,922 | 9/1963 | Lashmutt | 339—119 C |
| 2,997,687 | 8/1961 | Walter | 339—184 R |
| 3,149,898 | 9/1964 | Klumpp, Jr. | 339—184 R |
| 2,942,228 | 6/1960 | Swick | 339—184 R |

FOREIGN PATENTS

| 624,335 | 6/1949 | Great Britain | 136—235 |

OTHER REFERENCES

"Thermocouples," Leeds & Northrup Co. Catalog D1.1001, 1967, pp. 9, 11, 14, 17, 20–23, 34, 35, 38–40, 43, 44.

HARVEY E. BEHREND, Primary Examiner

U.S. Cl. X.R.

73—359; 136—235; 339—184 R, 119 C, 252 P